(12) United States Patent
Watts

(10) Patent No.: US 9,054,558 B2
(45) Date of Patent: Jun. 9, 2015

(54) AUTOMATED SHORE POWER SYSTEM

(75) Inventor: Michael Watts, Seattle, WA (US)

(73) Assignee: Cochran Inc., Seattle, WA (US)

(*) Notice: Subject to any disclaimer, the term of this patent is extended or adjusted under 35 U.S.C. 154(b) by 854 days.

(21) Appl. No.: 13/270,899

(22) Filed: Oct. 11, 2011

(65) Prior Publication Data

US 2012/0032519 A1    Feb. 9, 2012

Related U.S. Application Data

(63) Continuation of application No. PCT/US2010/031122, filed on Apr. 14, 2010.

(60) Provisional application No. 61/169,272, filed on Apr. 14, 2009.

(51) Int. Cl.
H02J 3/18 (2006.01)
H02J 3/46 (2006.01)

(52) U.S. Cl.
CPC ........................................ *H02J 3/46* (2013.01)

(58) Field of Classification Search
CPC ... B63J 2003/043; F05B 2240/95; H02J 3/18; H02J 3/46
See application file for complete search history.

(56) References Cited

U.S. PATENT DOCUMENTS

| | | | |
|---|---|---|---|
| 5,804,953 A * | 9/1998 | Bowyer et al. | 323/256 |
| 7,253,538 B2 * | 8/2007 | Fujita | 290/53 |
| 7,967,120 B2 | 6/2011 | Popesco | |
| 2005/0184589 A1 | 8/2005 | Fujita | |
| 2007/0251784 A1 | 11/2007 | Popesco | |

FOREIGN PATENT DOCUMENTS

| | | | |
|---|---|---|---|
| WO | 2006/079636 A1 | 8/2006 | |
| WO | 2007/060189 A1 | 5/2007 | |
| WO | 2007/060244 A2 | 5/2007 | |

OTHER PUBLICATIONS

International Search Report mailed Nov. 26, 2010, in corresponding International Application No. PCT/US2010/031122, filed Apr. 14, 2010.

\* cited by examiner

*Primary Examiner* — Jared Fureman
*Assistant Examiner* — Terrence Willoughby
(74) *Attorney, Agent, or Firm* — Christensen O'Connor Johnson Kindness PLLC

(57) ABSTRACT

A shore power system includes a primary switchgear, a secondary switchgear, a dual output power transformer disposed in electrical communication between the primary switchgear and the secondary switchgear, a grounding switch section, and a vessel connector assembly. The shore power system further includes an automation and control system for automating and/or controlling the delivery of power to the vessel from a source of power, such as a medium voltage power source. In embodiments of the present disclosure, the medium voltage power source may be from the power grid or may be from a discrete power generation station.

19 Claims, 10 Drawing Sheets

AUTOMATED SHORE POWER SYSTEM

CROSS-REFERENCE TO RELATED APPLICATIONS

The present application is a continuation of International Application No. PCT/US2010/031122, filed Apr. 14, 2010, which claims the benefit of U.S. Provisional Application Ser. No. 61/169,272, filed Apr. 14, 2009, all of which are hereby expressly incorporated by reference.

BACKGROUND

Due to health and environmental concerns, there is an increased effort to reduce the emissions from carbon based energy sources. One industry in which the reduction of emissions from carbon based energy sources is sought is the marine industry. In the marine industry, one main type of carbon based energy source is the diesel-electric generator used to supply power to large commercial vessels, such as cargo and cruise ships, for house loads (e.g., laundry and kitchen facilities, lighting, cabin amenities, HVAC, communication systems, etc.) This is especially true when the commercial vessel is docked in port.

Therefore, there is a need in the marine industry to provide a cleaner power alternative to the commercial vessel for powering these house loads when docked in port.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with aspects of the present disclosure, a shore power system for supplying power to a vessel is provided. The system includes a primary switchgear adapted to be connected to a source of power. The primary switchgear has one or more power characteristic measuring devices. The system also includes a secondary switchgear having one or more power characteristic measuring devices and a power transformer including a primary side having a power input and a secondary side having first and second power outputs. The power transformer is configured to receive power from the primary switchgear at a selected voltage and output power to the secondary switchgear at first and second voltages that are lower than the selected voltage. The system further includes a controlling device that is programmed for automating and/or controlling the delivery of power to the vessel from the source of power.

In accordance with another aspect of the present disclosure, a method for automating the supply of power from a shore power system to a vessel, comprising the steps of obtaining vessel characteristic data, receiving a vessel connection command to connect the shore power system to the vessel, verifying connection parameters between the vessel and the shore power system are complete, obtaining permission from the vessel to begin the supply of power; thereafter, supplying power to the vessel; and monitoring the supply of power to the vessel.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein.

DETAILED DESCRIPTION

Embodiments of the present disclosure will now be described with reference to the drawings where like numerals correspond to like elements. Embodiments of the present disclosure are generally directed to shore power systems suitable for providing power to large commercial (e.g., cruise, container, etc.) and military vessels when temporarily docked at port. Embodiments of the present disclosure are further directed to systems and methods for automating and controlling one or more components of the shore power system in order to deliver power to the vessel from a source of power (e.g., power grid, power generation plant, etc.). Although exemplary embodiments of the present disclosure will be described hereinafter with reference to cruise ships, it will be appreciated that aspects of the present disclosure have wide application, and therefore, may be suitable for use with many types of commercial vessels, such as cargo ships, oil tankers, etc., military vessels, etc. Accordingly, the following descriptions and illustrations herein should be considered illustrative in nature, and thus, not limiting the scope of the present disclosure, as claimed.

Prior to discussing the details of various aspects of the present disclosure, it should be understood that several sections of the following description are presented largely in terms of logic and operations that may be performed by conventional electronic components. These electronic components, which may be grouped in a single location or distributed over a wide area, generally include processors, memory, storage devices, display devices, input devices (e.g., sensors, data entry devices, etc.), etc. It will be appreciated by one skilled in the art that the logic described herein may be implemented in a variety of configurations, including software, hardware, or combinations thereof. The hardware may include but is not limited to, analog circuitry, digital circuitry, processing units, application specific integrated circuits (ASICs), and the like. In circumstances where the components are distributed, the components are accessible to each other via communication links.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Figure 1:
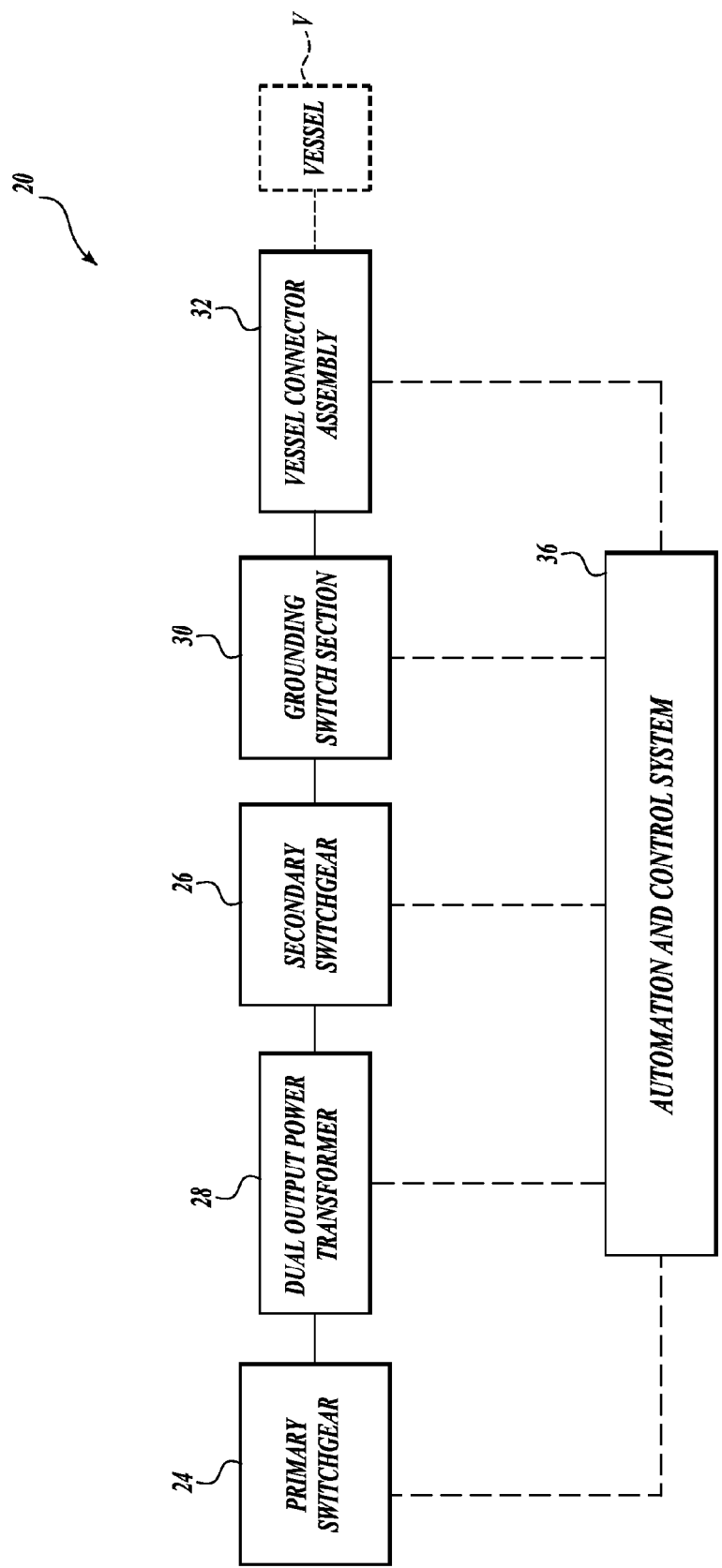
FIG. 1 is a block diagram of one exemplary embodiment of a shore power system formed in accordance with aspects of the present disclosure.

Turning now to FIG. 1, there is shown one exemplary embodiment of a shore power system, generally designated 20, formed in accordance with aspects of the present disclosure. Generally described, the shore power system 20 includes a primary switchgear 24, a secondary switchgear 26, a dual output power transformer 28 disposed in electrical communication between the primary switchgear 24 and the secondary switchgear 28, a grounding switch section 30, and a vessel connector assembly 32. The shore power system 20 further includes an automation and control system 36 for automating and/or controlling the delivery of power to the vessel V from a source of power, such as a medium voltage power source. In embodiments of the present disclosure, the medium voltage power source may be from the power grid or may be from a discrete power generation station.

Figure 2:
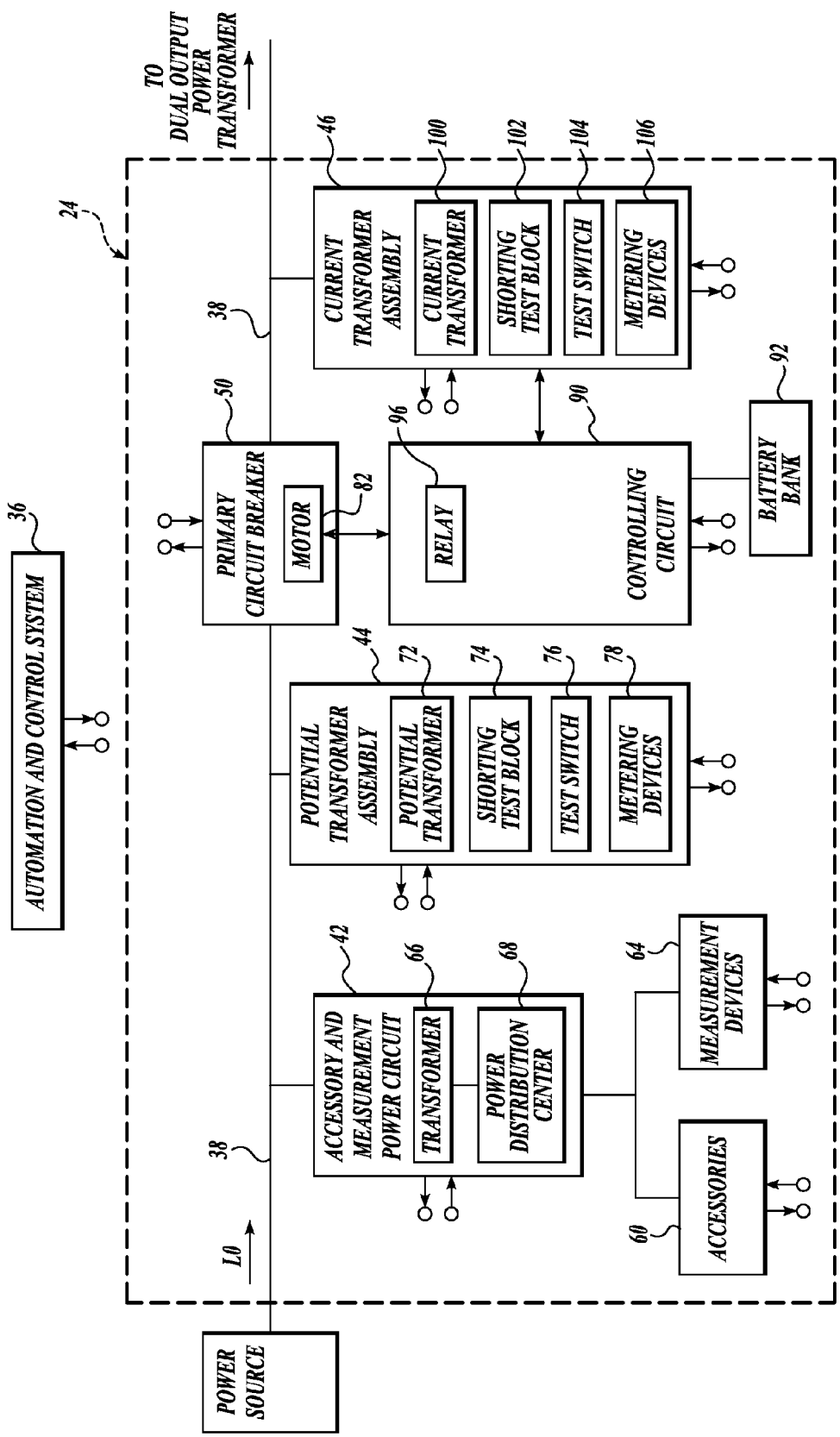
FIG. 2 is a schematic diagram of one exemplary embodiment of a primary switchgear formed in accordance with aspects of the present disclosure.

Referring now to FIGS. 1 and 2, the components of the shore power system 20 will now be described in more detail. As best shown in FIGS. 1 and 2, the shore power system 20 includes a primary switchgear 24 that connects the primary input of the power transformer 28 via a power line 38 to a source of medium voltage power, for example, power distribution equipment of a private or public utility company connected to the power grid. Generally described, the primary switchgear 24 includes a combination of electrical disconnects, fuses and/or circuit breakers used to isolate electrical equipment. In use, the primary switchgear 24 can be used to de-energize equipment, allow work/maintenance to be performed, to clear faults downstream, etc. In the exemplary embodiment described herein, the primary switchgear 24 is capable of handling medium voltages and operating under applicable standards, such as IEEE or ANSI (North America), IEC, etc.

In the embodiment shown, the primary switch gear 24 may include but is not limited to an accessory and measurement power circuit 42, a potential transformer assembly 44, a current transformer assembly 46, and a primary circuit breaker 50. The primary switchgear 24 may include other conventional components not shown but well known in the art.

As best shown in FIG. 2, the accessory and measurement power circuit 42 receives power from the power line 38 at level L0 and supplies an appropriate voltage (e.g., 120V/240V) to accessories 60, such as heaters, sirens, speakers, lights, fans, battery chargers, power receptacles, etc., and measurement devices 64, such as temperature sensors, gas sensors, tamper sensors, voltmeters, frequency meters, etc. In that regard, the power circuit 42 includes a fuse protected step down transformer 66, which receives power from the power line 38, steps down the voltage, and delivers the step down voltage to the accessories 60 and measurement devices 64 through a protected, power distribution center 68, such as a fuse or circuit breaker panel. In one embodiment, the transformer 66 is a 15KVA transformer having a current ratio of 400/5 A, and outputs a standard voltage supply line, such as a 120V, 240V, etc. supply line. As will be described in more detail below, the accessories 60 and the measurement devices 64 communicate with the automation and control system 36 via appropriate communication protocols known in the art.

The potential transformer assembly 44 also receives power from the power line 38 and conditions the power L0 from the power line 38 to supply suitable working voltages (120 v, 240 v, etc.) to other equipment of the primary switchgear 24. In that regard, the potential transformer assembly 44 includes a potential transformer 72, also know as a voltage transformer that presents a negligible load to the power line 38 while providing a precise voltage ratio to accurately step down the medium voltages so that equipment, such as metering and protective relay devices, can be operated at a lower potential. In one embodiment, the secondary output of a potential transformer 72 is rated from approximately 60 to 240 volts to match the input ratings of protection relays, etc., as will be described in more detail below. The potential transformer assembly 44 also includes a shorting test block 74, a test switch 76, metering devices 78 (e.g., voltmeter, frequency meter, etc.), etc. suitably interconnected in electrical communication as know in the art. As will be described in more detail below, components of the potential transformer assembly 44 communicate with the automation and control system 36 via appropriate communication protocols known in the art.

Downstream of the potential transformer assembly 44, the power line 38 is electrically connected to the input side of the primary circuit breaker 50. In use, the primary circuit breaker 50 is capable of interrupting fault currents of many hundreds or thousands of amps from downstream power equipment. The primary circuit breaker 80 may be of an oil type, a gas (e.g., SF6) type, an air type, or a vacuum type. In one embodiment, the primary switchgear 24 utilizes a primary circuit breaker of the vacuum type, which provides many benefits, including minimal arcing, large power handling (e.g., up to 35,000 volts), quick response time (e.g., between 30 mS and 150 mS), etc. In the embodiment shown, the primary circuit breaker 50 includes a motor 82 for opening and closing the circuit breaker. In one embodiment, the primary circuit breaker 50 is rated at 1200 amps, 27,000 volts, with 25,000 amps interrupting capacity.

Opening and closing of the primary circuit breaker 50 via the motor 82 may be controlled by a controlling circuit 90. In that regard, the opening and closing of the circuit breaker 50 may be under the direction of a systems operator via the control and automation system 36, may be an automatic response by the automation and control system 36 upon execution of the program module 318 (See FIG. 7), may be an automatic response to an operating condition, such as a fault, etc. The controlling circuit 90 provides one or more protective functions, which may include but is not limited to the following: overcurrent, undervoltage, directional power, and overvoltage. These, for example, may be carried out under any appropriate standards, such as ANSI standards 50/51 (overcurrent), 27 (undervoltage), 32 (direction power), and 59 (overvoltage). Operating power for the controlling circuit 90 may be supplied by the accessory and measurement power circuit 40, the potential transformer assembly 44, or a self contained power supply, such as a battery bank. In one embodiment, the controlling circuit 90 is powered by a battery bank 92, which receives recharging power from a battery charger associated with the accessory and measurement power circuit 42.

In the embodiment shown, the controlling circuit 90 includes one or more controllable, protective relays 96 for protection against operating conditions, such as overcurrent, undervoltage, directional power problems, and overvoltage. In that regard, the relay 96 measures the characteristics of the power L0 carried over power line 38, analyzes the measurements, and generates a trip signal to be transmitted to the motor 82 when it determines a fault condition. The relay may also be employed for transmitting open and close signals to the motor in response to suitable control signals received from the control and automation system 36. In one embodiment, the relay 96 can receive power for operating from the potential transformer assembly 44. One such relay 96 that may be employed in embodiments of the present disclosure is commercially available from Schweitzer Engineering Laboratories, Inc., such as SEL Model No. 351. As will be described in more detail below, the controlling circuit 90 is configured to communicate with the automation and control system 36 for receiving control signals from the system 36 and transmitting signals, such as measurement data (e.g., volts, amps, etc.), circuit breaker open or close condition data, etc., to the system 36.

Downstream of the primary circuit breaker 50, the power line 38 is electrically connected to the current transformer assembly 46. The current transformer assembly 46 in one embodiment may include, for example, a current transformer 100, a shorting test block (STB) 102, a test switch (TS) 104, and one or more metering devices 106, such as an ammeter. In operation, the current transformer assembly 46 facilitates safe measurement of large currents from the power line 38 by isolating measurement and control circuitry, such as the relay 96, from the high voltages of the power line 38. In one embodiment, the current transformer 100 has a 400:5 current windings ratio (i.e., a 4000:5 CT would provide an output current of 5 amperes when the primary was passing 4000 amperes). As will be described in more detail below, components of the potential transformer assembly 46 communicate with the automation and control system 36 via appropriate communication protocols known in the art.

Figure 3:
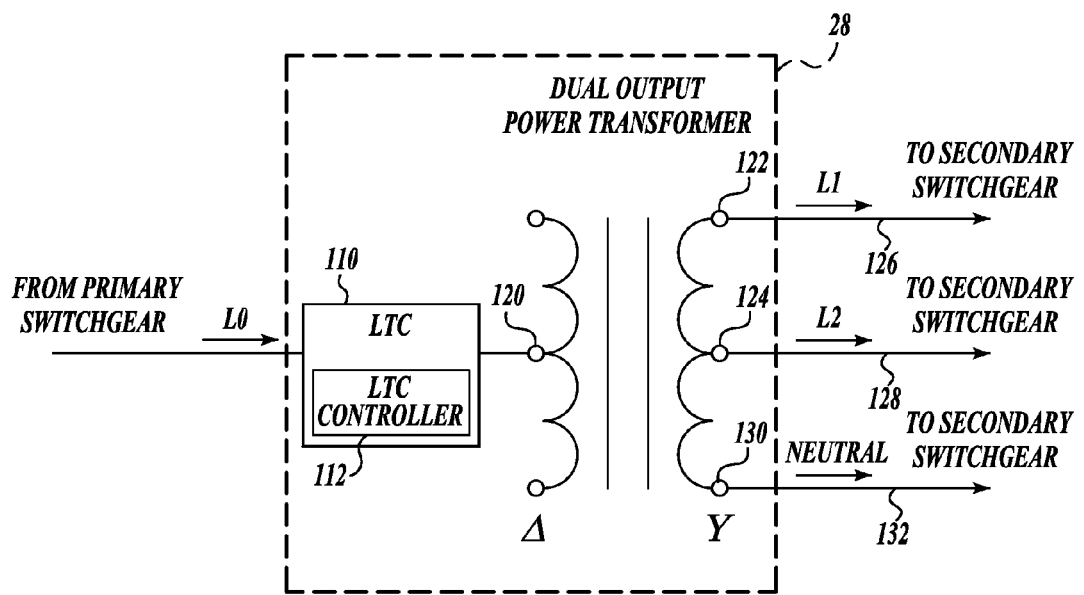
FIG. 3 is a schematic diagram of one exemplary embodiment of a dual output power transformer formed in accordance with aspects of the present disclosure.

Referring now to FIGS. 2 and 3, the power line 38 of the primary switchgear 24 is electrically connected to the primary input 120 of the dual output power transformer 28. The dual output power transformer 28 receives three phase power from the primary switch gear 24 at power level L0, e.g., 26,000 volts, and outputs power to first and second secondary outputs 122 and 124 at high and low power levels L1 and L2, e.g., 11,000 volts and 6,600 volts, respectively, and a single neutral output 130. The transformer 28 is of a delta-wye configuration for converting a single three phase power L0 into dual three phase power L1 and L2 and a single neutral N0. The power L1 and L2 is transmitted over power lines 126 and 128. In one embodiment, the dual power lines 126 and 128 provide power up to a 20MVA power consumption level.

In one embodiment, the power line 38 of the primary switchgear 24 is electrically connected to the primary input 120 of the dual output power transformer 28 via a load tap changer (LTC) 110. The LTC 110 may include a plurality of selectable tap positions (e.g., 2-32 or more). The LTC 110 may be configured as an automatic LTC having a controller 112 that controls the tap position of the LTC. The controller 112 may receive signals indicative of secondary output power from the secondary switchgear metering device, described below, or from control signals from the automation and control system 36. In one embodiment, the LTC, by changing the tap position between the plurality of tap positions, is capable of adjusting the voltage output of the high and low power levels L1 and L2, e.g., 11,000 volts and 6,600 volts, between 10,000 volts and 12,500 volts and 6,000 volts and 7,500 volts, respectively.

As will be described in more detail below, the automation and control system 36 in conjunction with the LTC 110 can adjust the primary input L0 according to the particular vessel V to which the system 20 is supplying power. For example, a large majority of cruise ships operate either on 6.6 kV or 11 kV. However, some cruise ships operate outside of these parameters, for example, at 6.8 kV. In this case, from information received from the vessel or from data associated with the vessel and stored in a look-up table, the automation and control system 36 can control the LTC 110 to adjust the voltage output L1 and/or L2 regardless of the power input L0 to match the power system characteristics of the vessel, and will maintain a consistent secondary voltage throughout the supply of power to the vessel.

Figure 4:
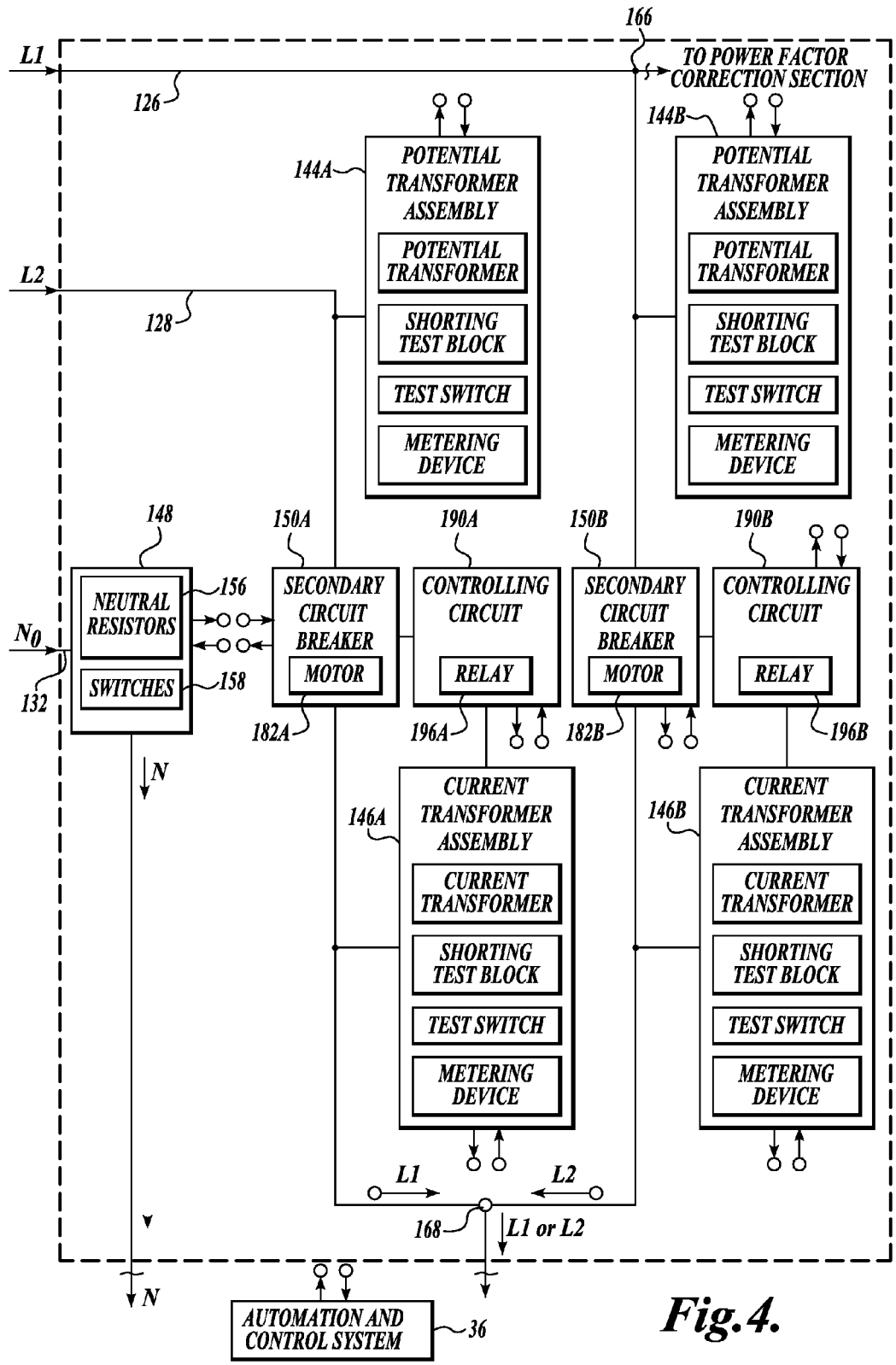
FIG. 4 is a schematic diagram of one exemplary embodiment of a secondary switchgear formed in accordance with aspects of the present disclosure.

As best shown in FIGS. 1 and 4, the shore power system 20 further includes a secondary switchgear 26 that connects the dual power lines 126 and 128 and a neutral line 132 of the dual output power transformer 28 to the grounding switch section 30. In the embodiment shown, the secondary switch gear 26 includes first and second power delivery sections composed of power components for each transformer power output 122 and 124. The first section, referred to as the high power (e.g., 11 kV) section, is connected to power line 126 and may include but is not limited to a current transformer assembly 142A, a potential transformer assembly 146A, and a secondary circuit breaker 150A. The second section, referred to as the low power (e.g., 6.6 kV) section, is connected to the power line 128 and may include but is not limited to a current transformer assembly 142B, a potential transformer assembly 146B, and a secondary circuit breaker 150B. The secondary circuit breakers 150A and 150B include motors 182A and 182B, respectively, for opening and closing the circuit breakers. Opening and closing of the secondary circuit breakers 150A and 150B via the respective motors 182A and 182B may be controlled by controlling circuits 190A and 190B. In one embodiment, the controlling circuits 190A and 190B include protective relays 196, which communicate with the automation and control system 36.

It will be appreciated that the first and second sections can be configured and arranged substantially similar to the corresponding components of the primary switchgear, and thus, will not be described in detail here. Downstream of the first and second sections, the power lines 126 and 128 are bussed together at secondary buss connector 168. As will be described in more detail below, components of the secondary switchgear 26 communicate with the automation and control system 36 via appropriate communication protocols known in the art.

Figure 5:
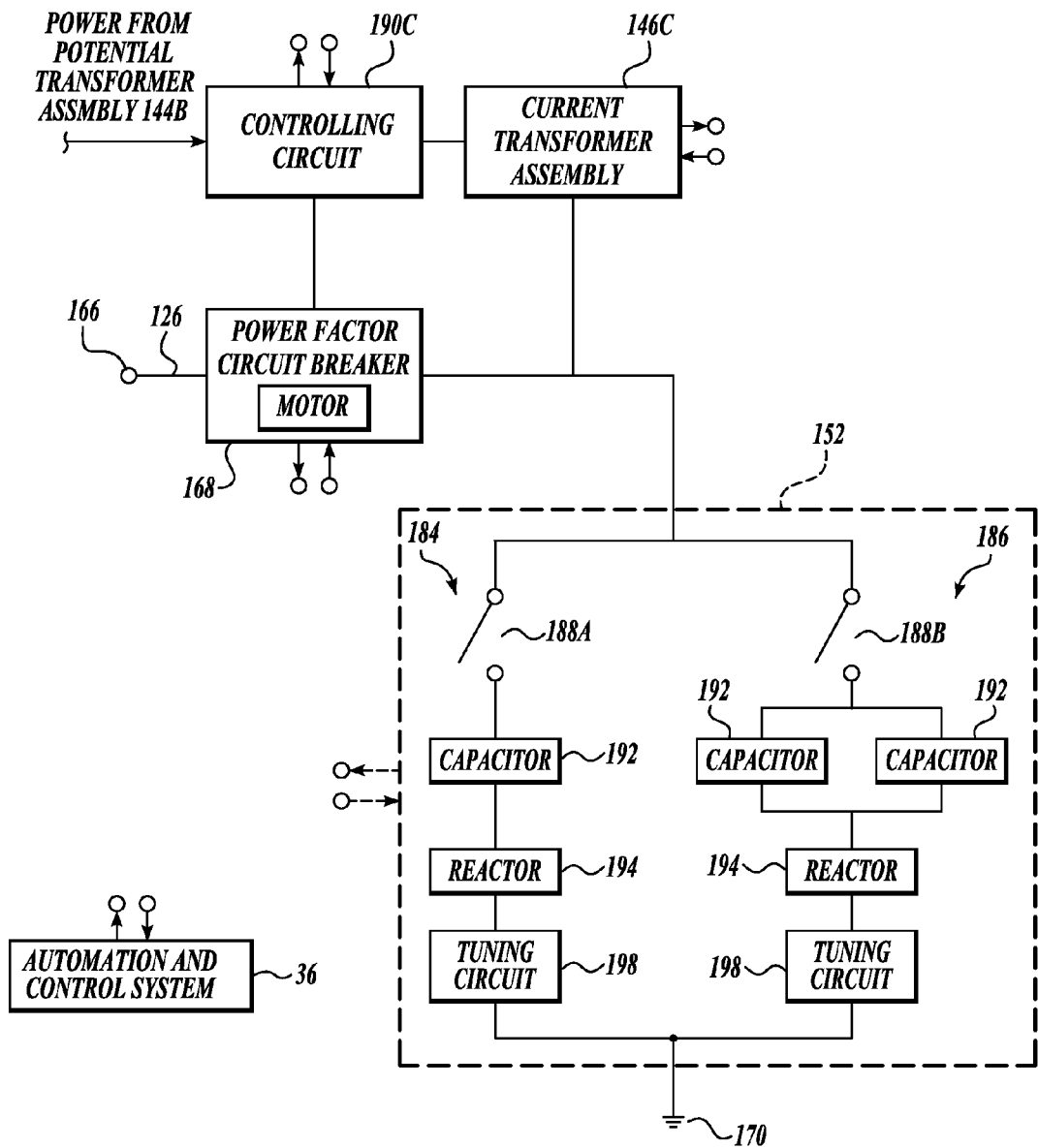
FIG. 5 is a schematic diagram of one exemplary embodiment of a power factor correction section formed in accordance with aspects of the present disclosure.

Turning now to FIGS. 4 and 5, the switchgear 26 may further include a neutral grounding resistor section 148 and/ or a power factor correction section 152. As shown in FIG. 4, the neutral grounding resistor section 148 comprises a plurality of neutral resistors 156 arranged, for example, in a ladder configuration, and selectively connected to the neutral line 132 via a series of controllable switches 158, such as vacuum switches. In use, from information received from the vessel or from data associated with the vessel and stored in a look-up table, the automation and control system 36 selects, via the series of controllable switches 158, the appropriate neutral resistor or resistors from the plurality of resistors 156 in order to substantially match the neutral resistance value of the particular vessel's electrical system.

Referring now to FIGS. 4 and 5, the power factor correction section 152 is connected in an appropriate manner to the power line 124 at node 166 and is grounded at 170. The power factor correction section 152 is protected via a power factor correction section circuit breaker 168. The circuit breaker 168 may be controlled by a controlling circuit 190C. In one embodiment, the controlling circuit 190C is arranged and configured substantially similar to controlling circuit 90 of the primary switchgear. The controlling circuit 190C may be powered by the potential transformer assembly 144A of the secondary switchgear and may measure the current of line 126 via the current transformer assembly 146C.

As best shown in FIG. 5, the power factor correction section 152 is a circuit that includes one or more sets of series connected capacitor-reactor pairs. In the embodiment shown in FIG. 5, the power factor correction section 152 includes first and second stages 184 and 186. The first stage 184 includes a capacitor 192 and a reactor 194 connected in series with the circuit breaker 168 through a controllable vacuum switch 188A. The reactor 194 is tuned by a harmonic tuning circuit 198. In one embodiment, the capacitor/reactor pair is chosen to provide approximately 1480 KVARs of reactive power. The second stage 186 includes a capacitor/reactor group connected in series with the circuit breaker 168 through a controllable vacuum switch 188B. The reactor 194 is tuned by a harmonic tuning circuit 198. In the embodiment of FIG. 5, the second stage includes at least two (2) capacitors 192 connected in parallel. In one embodiment, the capacitors/reactor pair is chosen to provide approximately 2960 KVARs of reactive power. In use, the system 36 monitors the real power from the appropriate metering devices of the primary switchgear 24 and the reactive power from the power line 220 (see FIG. 6) outputted from the grounding switch section 30 in order to calculate the power factor of the power delivered to the vessel by the shore power system 20. During this continuous monitoring, the system 36 is capable of selectively opening/closing the switches 188A and/or 188B to maintain an acceptable power factor (e.g., >0.9) for the delivery of power to the vessel V.

Figure 6:
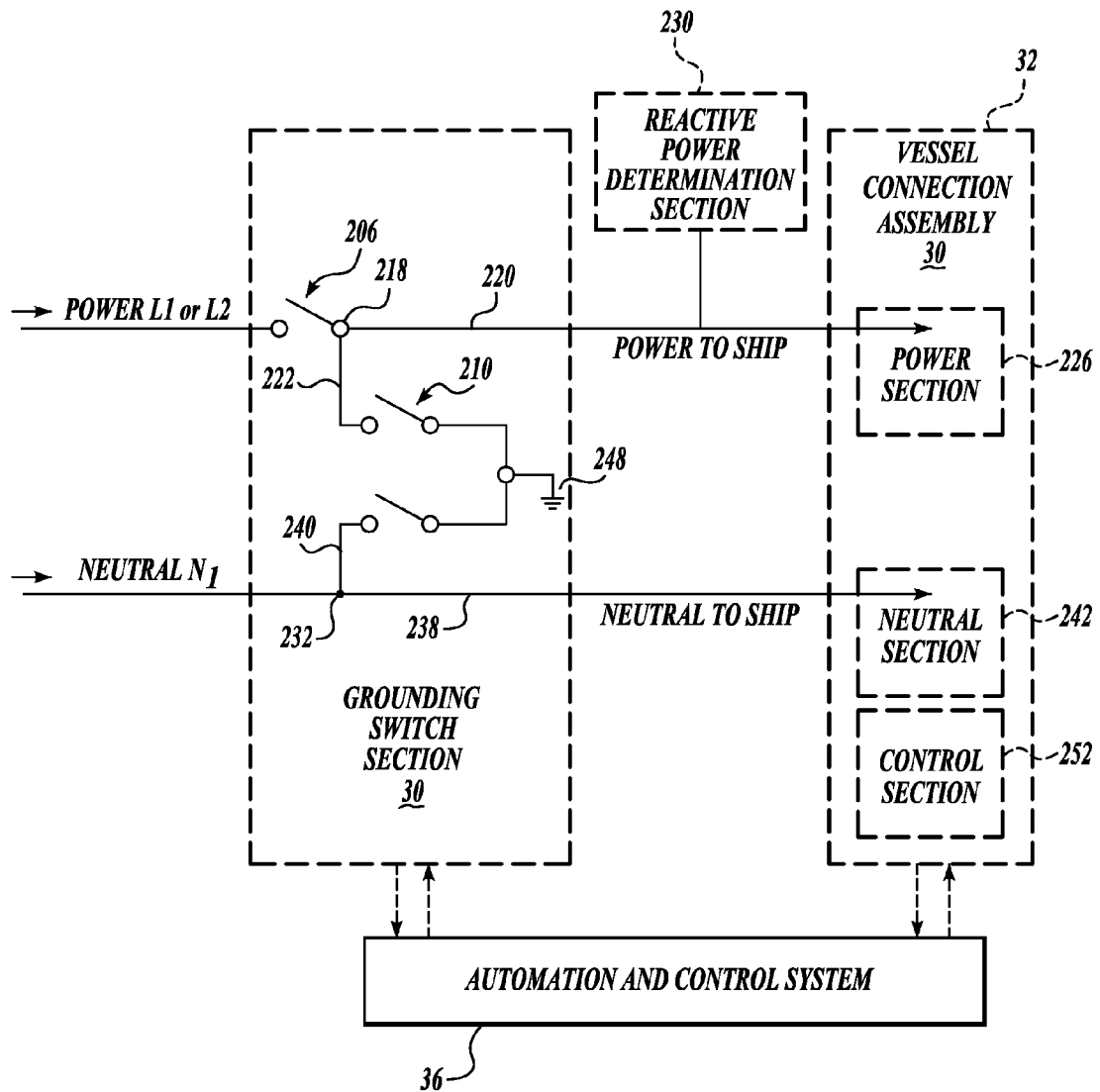
FIG. 6 is a schematic diagram of one exemplary embodiment of a grounding switch section formed in accordance with aspects of the present disclosure.

Turning now to FIG. 6, the grounding switch section 30 of the system 20 will be described in more detail. As best shown in FIG. 6, the grounding switch section 300 includes a power connect switch 206, also referred to as the feeder switch, and a ground switch 210. The power connect switch 206 is electrically connected to the secondary bus connector 168, which carries power L1 or L2 depending on the state (i.e., open or closed) of the associated circuit breakers 150A and 150B. In one embodiment, the power connect switch 206 is a non-loadbreak disconnect switch rated, for example, at 2000 amps. The operational state (i.e., open or closed) of the power connect switch 206 is controlled by the automation and control system 36, and may be monitored by appropriate sensors, contact switches, etc.

Downstream of the power connect switch 206, the power line branches at node 218, in which a first branch 220 is electrically connected to the power section 226 of the vessel connection system 32 and a second branch 222 is connected to the input side of the ground switch 210. Connected to the first branch or power line 220 is a reactive power determination section 230. In one embodiment, the section 230 may include power transformers, current transformers, metering devices 234, including a wattmeter, voltmeter and an ammeter, etc., suitable arranged for measuring the reactive power of the vessel V. The reactive power determination section 230 communicates with the automation and control system 36 via appropriate communication protocols known in the art.

Similar to the power connect switch 206, downstream of the neutral resistor section 148, the neutral line branches at node 232, in which a first branch 238 is electrically connected to the neutral section 242 of the vessel connection system 32 and a second branch 240 is connected to the input side of the ground switch 210. As best shown in FIG. 6, the output side of the ground switch 210 is grounded at 248. It will be appreciated that the appropriate sensors, such as ground switch sensors 250, ground check monitoring circuits, etc., may be associated with ground 248 for determining whether the ground switch 210 is properly connected to ground. The operational state (i.e., open or closed) of the ground switch 210 is controlled by the control and automation system 36, and may be monitored by appropriate sensors, such as ground switch sensors 250, contact switches, etc. In use, the ground switch 210, under control of the control and automation system 36, may be positioned in the "closed" position, thereby taking the power line and the neutral line to ground.

Still referring to FIG. 6, the shore power system 20 further includes a vessel connection assembly 32 that interfaces with the vessel V for the delivery of power thereto and the exchange of control signals therewith. As best shown in FIG. 6, the vessel connection assembly 32 includes a power section 226 that comprises one or more power line cable/connector pairs, a neutral section 242 that comprises a neutral line cable/connector pair, and a control section 252 that comprises control line cable/connector pairs, etc. that cooperate with appropriately configured connectors on the vessel. Each connector includes a contact or continuity sensor 240 that outputs data to the control and automation system 36 for indicating whether the connectors are properly connected to the vessel V.

As described briefly above, the primary switchgear 24, the secondary switchgear 26, and the grounding switch section 30 are controlled by the automation and control system 36. One embodiment of the automation and control system 36 is illustrated as a block diagram in FIG. 7. Although not required, aspects of the present disclosure may be described in the general context of computer-executable instructions, such as program modules, being executed by a personal computer or computing device and stored, for example, on computer readable media, as will be described below. Generally, program modules include routines, programs, objects, components, data structures, etc., that perform particular tasks or implement particular abstract data types.

The automation and control system 36 includes a computing device 302 having a processor 304, a memory 306, and I/O circuitry 308 suitably interconnected via one or more buses 312. The system memory 306 may include read only memory (ROM), random access memory (RAM), and storage memory. The storage memory may include hard disk drives for reading from and writing to a hard disk, a magnetic disk drive for reading from or writing to a removable magnetic disk, and an optical disk drive for reading from or writing to a removable optical disk, such as a CD, DVD, or other optical media. The storage memory and their associated computer-readable media provide non-volatile storage of computer readable instructions, data structures, program modules, and other data for the computing device 302. Other types of computer readable media which can store data that is accessible by a computer, such as magnetic cassettes, flash memory cards, DVD-ROM, DVD-RAM, and the like, may also be used in the exemplary computing system.

The memory 306 stores an operating system 316 for controlling the operation of the computing device 302. In one embodiment of the disclosure, the operating system 316 provides a graphical operating environment, such as Microsoft Corporation's WINDOWS®, LINUX or Apple's Leopard graphical operating system in which activated applications, programs, or modules are represented as one or more graphical application windows with an interface visible to the user, such as a graphical user interface (GUI). The memory 306 also stores a number of program modules, such as a vessel connection program module 318, and program data 320, such as vessel power characteristic data for each vessel, historical alarm data, sensor data, etc.

Figure 7:
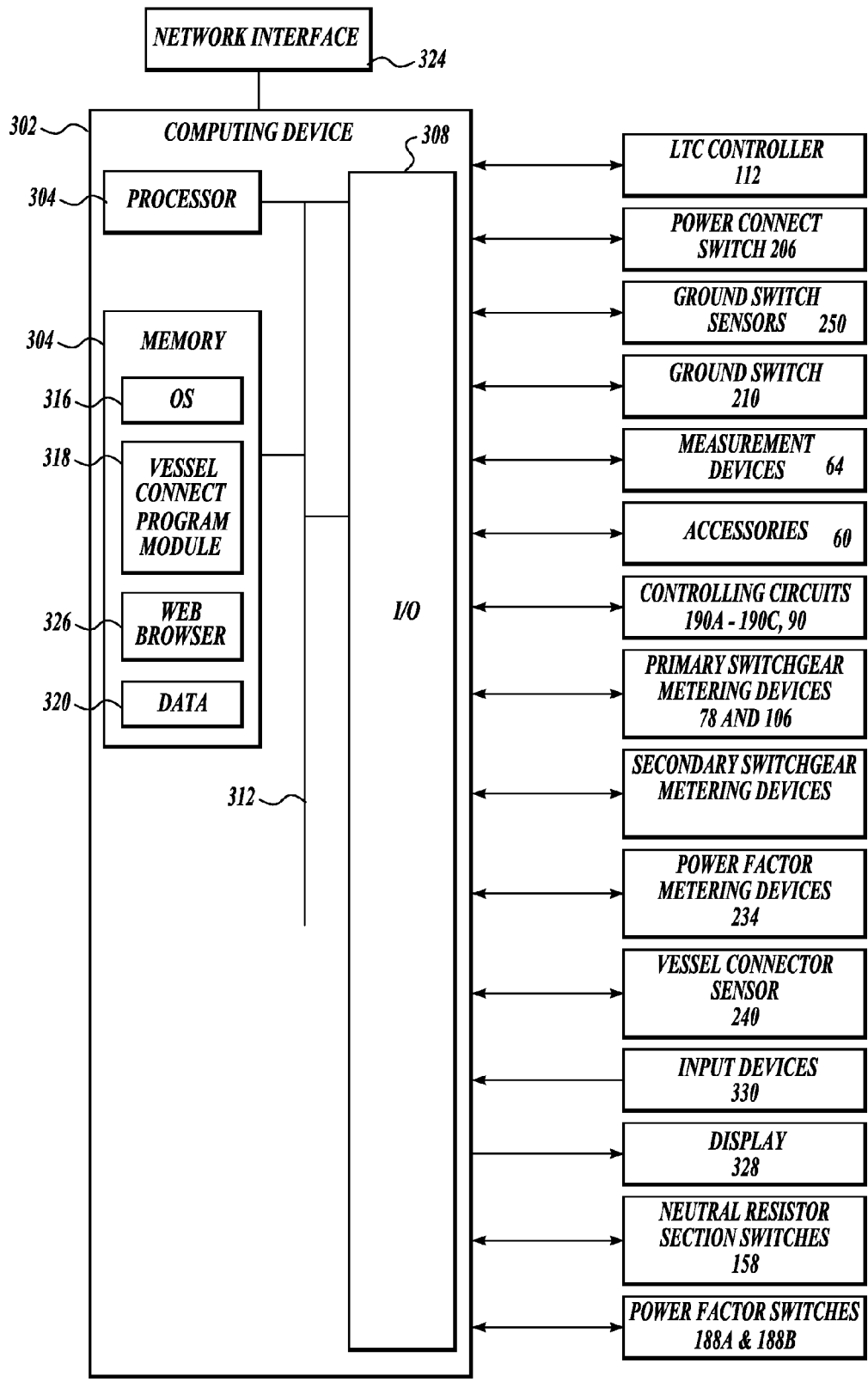
FIG. 7 is a schematic diagram of one exemplary embodiment of an automation and control system formed in accordance with aspects of the present disclosure.

As shown in FIG. 7, the computing device 302 includes a network interface 324 comprising one or more components for communicating with other devices, e.g., cell phones, PDA's, laptop computer, network terminals, general purpose computing device, desktop computer, etc. over a wired and/or wireless network, such as a local area network (LAN) or a wide area network (WAN), such as the internet. As known to those skilled in the art and others, the computing devices illustrated in FIG. 7 may be configured to exchange files, commands, and other types of data over one or more networks. However, since protocols for network communication, such as TCP/IP, are well known to those skilled in the art, those protocols will not be described here. Additionally or alternatively, the computing device may be equipped with a modem (not shown) for connecting to the Internet through a point to point protocol ("PPP") connection or a SLIP connection as known to those skilled in the art. For accessing the internet, the memory 306 may further include a web browser 326, such as Netscape's NAVIGATOR®, Microsoft's Internet Explorer, Mozilla's FireFox, etc.

The computing device 302 also includes an output device in the form of a graphical display 328 and several input devices 330, such as a keyboard, touch pad, microphone, a pointing device, or the like, for inputting data into the computing device 302, such as responding to requests from execution of the vessel connection module 318. The display 328 and the user input devices 330 are suitably connected through appropriate interfaces, such as serial ports, parallel ports or a universal serial bus (USB) of the I/O circuitry. As would be generally understood, other peripherals may also be connected to the processor in a similar manner.

Input/Output circuitry 308 or other device level circuitry of the computing device 302 is connected in electrical communication with components of the primary switchgear 24, the secondary switchgear 26, the grounding switch section 30, and the vessel connection assembly 32. In particular, data generating devices, such as accessories 60, measurement devices 64, metering devices 78 and 106, etc., of the primary switchgear 24 communicate with the computing device 302 via one or more protocols known in the art. Similarly, as best shown in FIG. 7, data generating devices of the secondary switchgear 26, grounding switch section 30 and vessel connection section 32 communicate with the computing device 302 via one or more protocols known in the art. The Input/Output circuitry 308 is further connected in electrical communication with controllable switches, relays, etc. of the various components of the system 20. In use, the Input/Output circuitry 308 or other device level circuitry is capable of receiving, processing, and transmitting appropriate signals between the processor and these various components.

The vessel connection module 318, when executed by the computing device, presents a graphical user interface to the operator, and in one embodiment, opens within a web browser environment. The vessel connection module 318 is capable of graphically displaying information to and requesting data from the operator, analyzing data received from the components, and generating control signals to be transmitted to the components of the system 20 through the I/O circuitry 308.

The vessel connection module 318 further accesses stored data, such as vessel characteristic data.

Figure 8:
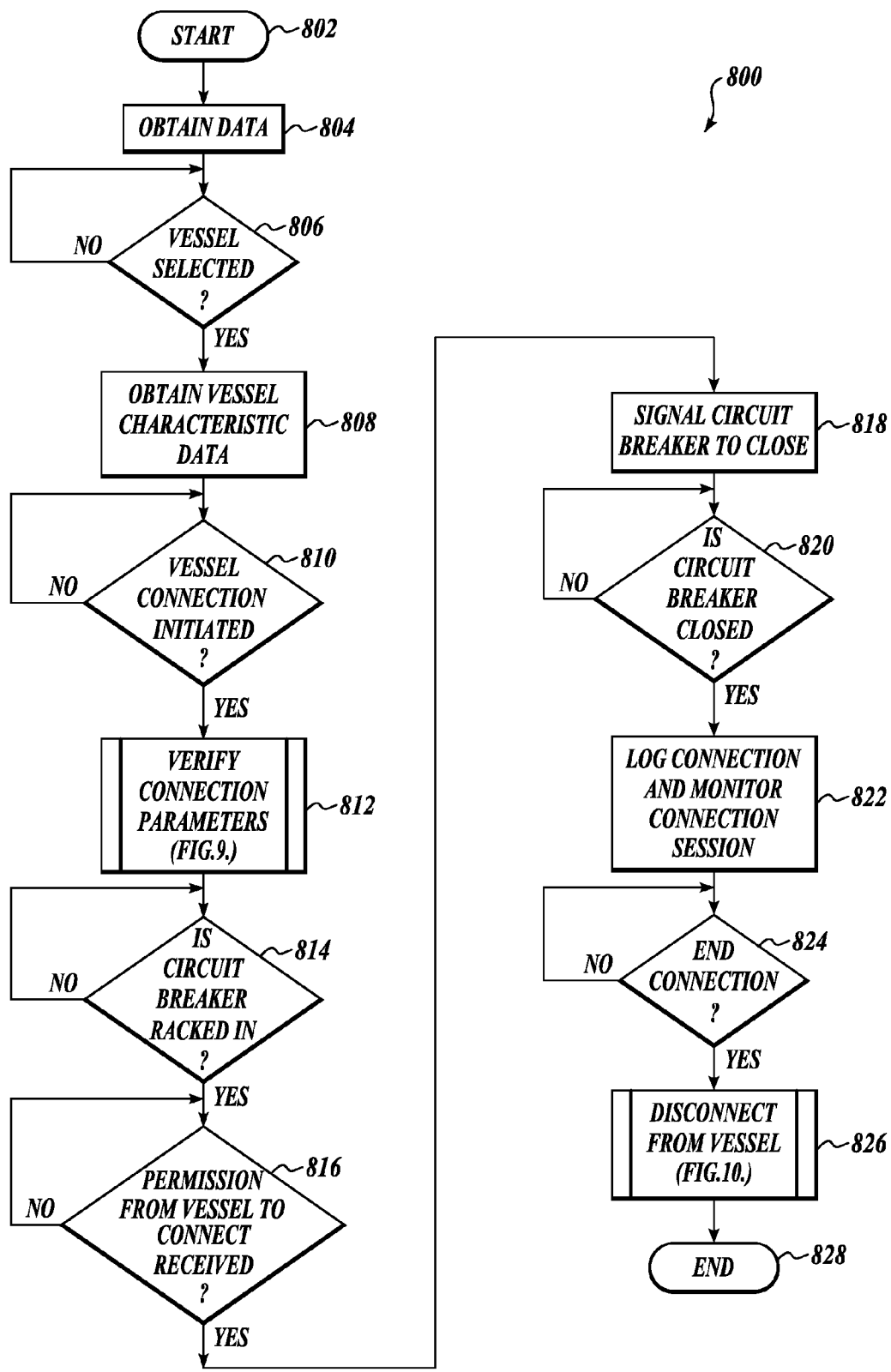
FIG. 8 is a flow diagram of one exemplary embodiment of a connection session implemented by a vessel connection program module in accordance with aspects of the present disclosure.

Turning now to FIG. 8, there is shown a flow diagram of one exemplary vessel connection routine 800 executed by the vessel connection module 318. The routine 800 checks whether the shore power system 20 is ready to connect to the vessel and vice versa, coordinates the connection between the system 20 and vessel V, monitors the connection session, and disconnects the vessel from the system 20 upon certain conditions. Before the vessel connection routine 800 can be initiated, a vessel, such as a cruise ship, is docked in port, and has requested the use of the shore power system 20. Once the vessel V is in port and is ready to be connected to the shore power system 20, the shore power system operator logs into the computing device 302, and upon execution of the vessel connection module 318, is presented graphically with a new connection session.

One exemplary session will now be described with reference to routine 800. Routine 800 begins at block 802 and proceeds to block 804, where data is obtained by the computing system 200 to be utilized by the program module 118. The obtained data includes but is not limited to one or more of the following: tide data, weather data, historical alarm data, vessel schedule data, and utility company power supply data. The obtained data may be presented to the operator on the display 328 via the GUI or a link may be provided, that when selected or "clicked" by one of the input devices 330, such as a computer mouse, directs the operator to a new window that displays the requested data.

Once the data is obtained at block 804, including the vessel schedule data, the routine 800, at block 806, determines whether a vessel has been selected for subsequent connection. For example, the operator via one or more of input devices 330 either self initiates the selection of the specific vessel that is currently in port or selects a vessel in response to a request by the routine 800. The vessel V may be selected, for example, from a stored historical menu of past connections, selected from a menu of all known vessels currently operating in the specific region of the port, or may be selected by inputting a code or vessel name via keyboard input. If the answer at block 806 is "yes," the routine 800 proceeds to block 808, where the vessel characteristics, such as operating voltage, resistive load data, neutral resistor value, etc., breaker coordination data, etc. of the selected vessel is obtained from memory 306, an associated server via the network interface 324, etc.

Once the data is obtained at block 808, the routine 800, at block 810, determines whether the operator has initiated the vessel connection sequence for connecting the shore power system 20 to the vessel V. For example, the operator may initiate a connection with the selected vessel by selecting, clicking, etc. on the appropriate icon or the like that is graphically presented by the program module 318. If the answer at block 810 is "yes," the routine 800 proceeds to block 812, where a connection verification subroutine (see FIG. 9) is performed by the program module 318. As will be described in more detail below, the connection verification subroutine executes systems checks on several components of the system 20, and verifies that it is safe for one or more technicians to, for example, connect the power cables of the vessel connection assembly 32 to the vessel V. If any of the checks are not satisfied, the system 36 is locked out until such checks are satisfied.

Figure 9:
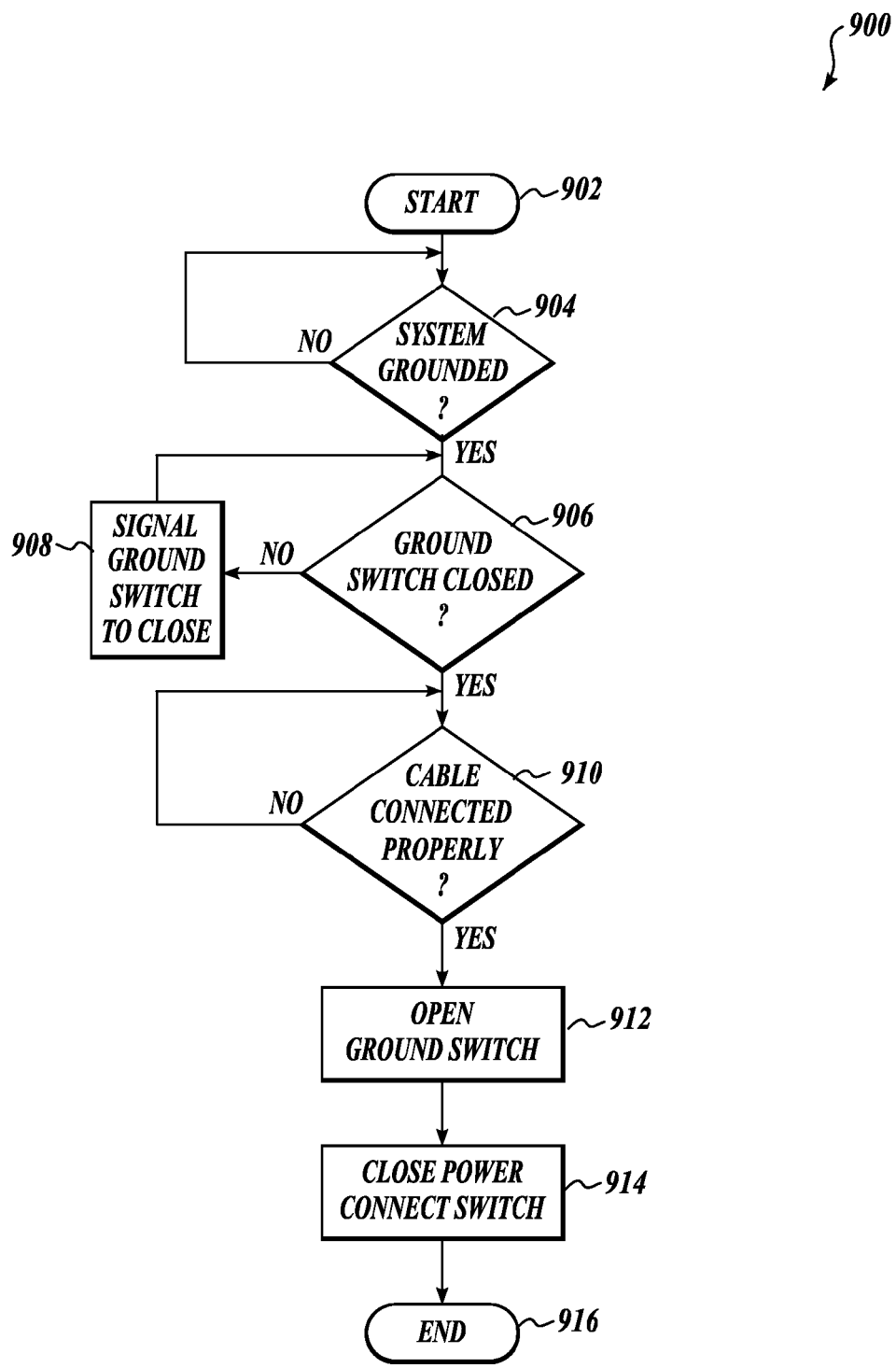
FIG. 9 is a flow diagram of one exemplary embodiment of a connection verification subroutine implemented by the vessel connection program module in accordance with aspects of the present disclosure.

Turning now to FIG. 9, there is shown one connection verification subroutine 900 implemented by the program module 318. The subroutine begins at block 902, and proceeds to block 904. At block 904, the subroutine determines whether the grounding switch section 30 is properly grounded. For example, a sensor, grounding monitoring circuit, or other electrical device is provided that is capable of determining if the ground switch 210 is properly grounded and reporting the condition of the ground switch to the automation and control system 36. If the answer at block 904 is "yes," the subroutine 900 proceeds to block 906, where the subroutine 900 determines whether the ground switch 210 is closed. For example, ground switch sensors, contact switches, etc., may be employed to signal the operating position (open or closed) of the ground switch 210. If the answer is "no," the subroutine 900 proceeds to block 908, where the computing device 302 signals the ground switch 210 to close, and then returns to block 906. This repeats until the answer at block 906 is "yes." When the answer is "yes" at block 906, the subroutine 900 proceeds to block 910.

Next, at block 910, the subroutine determines whether the cable connectors of the vessel connection assembly 32 are properly connected at the vessel interface. For example, continuity sensors 240 associated with the cable connectors may be employed to output a signal indicative of proper contact with the vessel interface. If the answer is "no," the subroutine 900 may notify the operator that the cable connectors are not properly connected. The subroutine repeats block 910 until the answer at block 910 is "yes." When the answer is "yes" at block 910, the subroutine proceeds to block 912.

At block 912, the program module 318 sends control signals to the ground switch 210 to open, and then verifies, via the appropriate sensors, contact switches, etc., that the operational condition of the ground switch is open. Next, the program module 310 sends control signals to the power connect switch 206 to close, and then verifies, via the appropriate sensors, contact switches, etc., that the operational condition of the power connect switch 206 is closed. The subroutine 900 then proceeds to block 916 where the subroutine ends.

Upon successful completion of the connection verification subroutine, the routine 800 notifies the operator via display 328, and as a result, the operator can instruct other personnel to manually rack-in the appropriate circuit breaker(s). For example, if the information associated with the vessel obtained at block 808 indicates that the power line supplying power L2 is required, then the circuit breaker 150B is racked-in. It may also be necessary to rack-in the circuit breaker 50 of the primary switchgear 24. During this time, at block 814, the routine 800 awaits confirmation that the appropriate circuit breakers are racked-in. Such confirmation can come from appropriate sensors associated with the circuit breakers 50, 150A, 150B, that generate signals indicating that the specified circuit breaker is appropriately racked-in. In one embodiment, these sensors may be associated with the relays 90, 190A, 190B, etc.

Next, at block 816, the routine 800 waits to receive a signal from the vessel granting permission to close the specified circuit breaker. Once permission is received, the routine 800 proceeds to block 818, where a command to close the specified circuit breaker 150B is displayed, prompting the operator for input. Alternatively, the routine 800 may autonomously signal the motor 182B associated with the secondary circuit breaker 150B to be closed. This may be instantaneous or within a predetermined time period (e.g., five (5) minutes) upon reception of the permission signal. In either case, the program module 318 generates and transmits device appropriate breaker close signals to the relay 196B for closing the circuit breaker 150B via motor 182B.

Once the circuit breaker 150B is closed, whereby the system 36 receives verification via sensors, etc., the system 20 begins supplying power to the vessel V. Next, the routine 800, at block 822 begins to log the connection as a new session and begins to monitor the connection of the system 30 to the vessel V. With this monitoring, the routing 800 chooses the appropriate neutral resistors via the switches 158 in view of the received neutral resistor value and supplies power to the power factor correction section 152 by closing power factor circuit breaker 168. The routine 800 also chooses the appropriate tap position of the LTC 110 via the LTC controller 112 according to the received operating voltage of the vessel. For example, if the received operating voltage for the vessel is 6.8 kV, the routine 800 selects the secondary output 122 or 124 (and power L1 or L2) closest to the vessel operating voltage (e.g., 6.6 kV) at block 814, and selects the tap position from the plurality of tap positions of the LTC 110 that corresponds with an output power L2 of 6.8 kV. The system 36 then continues to monitor the secondary output voltage and the power factor of the system, correcting when necessary via the LTC 110 and the control of the switches 188A and/or 188B, respectively.

During the connection session, the system 36 also monitors alarm conditions of the system 20, such as high operating temperatures, low pressure levels in the breakers, tampering of components by unauthorized personnel, etc. If it is determined an alarm condition exists, the routine 800 sends an alert signal to the appropriated party. The alert signal could be an automatic page, a telephone or cellular phone call, an e-mail, or other means for notifying an operator, technician, etc., that is either local or remote from the system 20. It may also include an audible signal, such as a horn or buzzer, a visible signal, such as a flashing red light, etc. Further, the alert signal could shut down the system 20 until operator or technician input is obtained. It may also cause the operator to manually check the equipment. Alert signals may be presented to the operator via the GUI on display 328. Other data may be displayed to the operator during the connection, such as the characteristics of the power being supply to the vessel V, unbalanced conditions, reactive power, etc. Session data monitored by the system 36 may be stored in memory 306 for future reference.

The routine 800 continues to monitor the connection until connection permission is revoked by the vessel V. If such a signal is received, the routine 800 proceeds to block 826, where a vessel disconnect subroutine is initiated by the program module 318. Once the vessel disconnect routine is finished, the routine 800 proceeds to block 828, wherein the routine is terminated.

Figure 10:
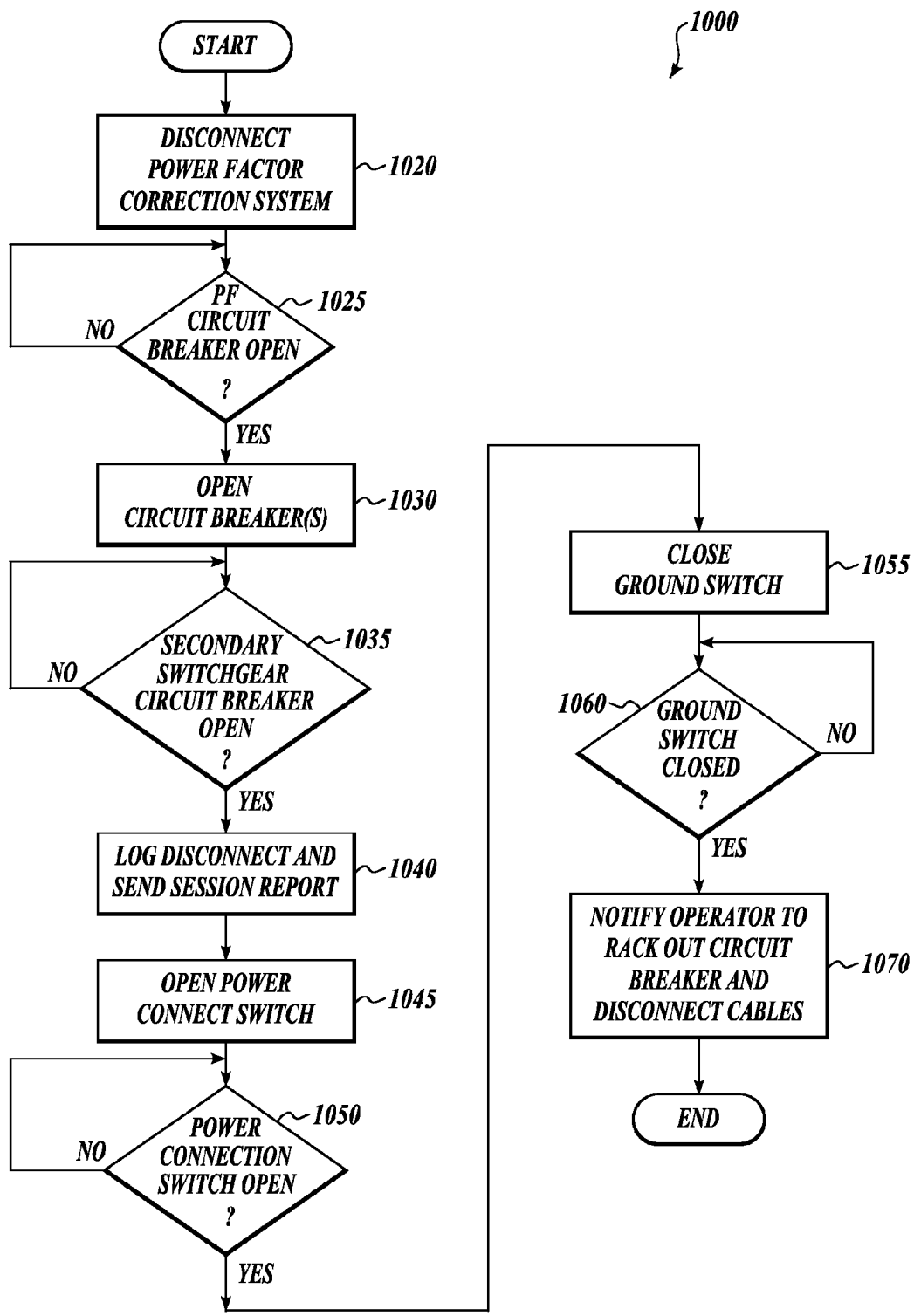
FIG. 10 is a flow diagram of one exemplary embodiment of a vessel disconnect subroutine implemented by the vessel connection program module in accordance with aspects of the present disclosure.

Turning now to FIG. 10, there is shown one vessel disconnect subroutine 1000 implemented by the program module 318. The subroutine 1000 begins at block 1010 and proceeds to block 1020 where the program module disconnects the power factor correction section 152 by opening the power factor circuit breaker 168 and/or the switches 188A and 188B. Once the subroutine 1000 determines at block 1025 that the power factor (PF) circuit breaker 168 is open by receiving and processing signals from the appropriate sensors, contact switches, etc., the subroutine 1000 proceeds to block 1030, where the program module 318 signals the secondary circuit breaker 150B to open. The subroutine 1000 then proceeds to block 1035 until the circuit breaker open condition is verified. Next, at block 1040, the program module 310 logs the disconnected session and sends a session report contained various session data that was stored in memory 306 to the appropriate personnel.

The subroutine 1000 proceeds by signaling the power connect switch 206 to open at block 1045, and remains at block 1050 until the operational condition of the power connect switch 206 is verified via appropriate sensors, contact switches, etc., to be open. The subroutine 1000 then signals the ground switch 210 to close at block 1055, and remains at block 1060 until the operational condition of the ground switch 210 is verified via appropriate sensors, contact switches, etc., to be closed. Next, the subroutine 1000 proceeds to block 1070, where the program module 318 notifies the operator to rack out the circuit breaker 150B and disconnect the power and neutral cables from the vessel V.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. A shore power system for supplying power to a vessel, comprising:
    a primary switchgear adapted to be connected to a source of power, the primary switchgear having one or more power characteristic measuring devices;
    a secondary switchgear having one or more power characteristic measuring devices;
    a power transformer having a primary side and a secondary side, the primary side having a power input and the secondary side having first and second power outputs, wherein the power transformer is configured to receive power from the primary switchgear at a selected voltage and to output power to the secondary switchgear at first and second voltages that are lower than the selected voltage;
    a controlling device that is programmed for automating and/or controlling the delivery of power to the vessel from the source of power.

2. The shore power system of claim 1, wherein the power transformer further includes a load tap changer at the primary side, the load tap changer configured to adjust the first and second voltages outputted by the secondary side.

3. The shore power system of claim 2, wherein the controlling device is programmed to receive one or more signals indicative of a characteristic of the first or second voltage, and based on the received one or more signals, transmitting one or more control signals to the load tap changer so that the load tap changer adjusts the first and/or second voltages outputted by the secondary side.

4. The shore power system of claim 1, further comprising a power factor circuit and a power factor determination section, wherein the power factor determination section is configured to measure a reactive power supplied to the vessel and wherein the controlling device is programmed to control the power factor circuit based on a measured reactive power from the power factor determination section and real power from the one or more power characteristic measuring devices of the primary switchgear.

5. The shore power system of claim 4, wherein the power factor circuit includes circuitry that changes the reactance of the power being supplied to the vessel.

6. The shore power system of claim 5, wherein the controlling device monitors the real power from the one or more power characteristic measuring devices of the primary switchgear and the reactive power supplied to the vessel from the power factor determination section, and dynamically adjusts the reactance of the power via the power factor circuit so as to maintain a preselected power factor for supplying power to the vessel.

7. The shore power system of claims 1, further comprising a neutral resistor section that is configured for changing the neutral resistance value of the secondary switchgear.

8. The shore power system of claim 7, wherein the controlling device is programmed to control the neutral resistor section based on obtained vessel power characteristic data.

9. The shore power system of claim 1, further comprising a grounding switch section that comprises a power connect switch that selectively controls the delivery of power to the vessel and a ground switch that selectively grounds the power supplied by the secondary switchgear.

10. The shore power system of claim 1, further comprising a vessel connection assembly that supplies power from the secondary switchgear to the vessel, wherein the vessel connection assembly includes a power section, a neutral section, and a control section, wherein the control section communicates with the vessel and transmits information received from the vessel to the controlling device.

11. The shore power system of claim 1, wherein the controlling device is programmed to select either the first or second voltages outputted by the first and second outputs, respectively, and wherein the selection is based on obtained vessel power characteristic data.

12. The shore power system of claim 1, wherein the controlling device programmed to (1) determine whether the system is ready to connect to the vessel; (2) assist in connecting the system to the vessel; (3) monitor the connection session between the system and the vessel; and (4) assist in disconnecting the system from the vessel.

13. A method for automating the supply of power from a shore power system to a vessel, comprising:
    obtaining vessel characteristic data;
    receiving a vessel connection command to connect the shore power system to the vessel;
    verifying connection parameters between the vessel and the shore power system are complete;
    obtaining permission from the vessel to begin the supply of power; thereafter supplying power to the vessel;
    monitoring the supply of power to the vessel,
    wherein verifying connection parameters between the vessel and a shore power system are complete includes determining if the system is grounded and determining if one or more vessel connection cables are properly connected to the vessel.

14. The method of claim 13, wherein verifying connection parameters between the vessel and the shore power system are complete further includes
    transmitting control signals that close a ground switch if it is determined that the system is not grounded.

15. The method of claim 14, wherein verifying connection parameters between the vessel and the shore power system are complete further includes
    if it is determined that the shore power system is grounded and the vessel connection cable is properly connected to the vessel then
    transmitting control signals to open the ground switch and to close a power connect switch.

16. The method of claim 13, wherein monitoring the supply of power to the vessel includes
    monitoring a power factor of the power being supplied to the vessel; and selecting one or more neutral resistors for substantially matching a neutral resistance value obtained with the vessel characteristic data.

17. The method of claim 13, wherein supplying power to the vessel includes selecting the first or second output of a dual power transformer based on the obtained vessel characteristic data.

18. A method of supplying power from a shore power system to a vessel, the shore power system having a dual output transformer, the method comprising:

selecting the first or second output of the dual output power transformer based on obtained vessel characteristic data, monitoring a power factor of the power being supplied to the vessel; and selecting one or more neutral resistors for substantially matching a neutral resistance value obtained with the vessel characteristic data.

19. The method of claim 18, further comprising monitoring operating parameters of the shore power system.

* * * * *